(12) United States Patent
Chang et al.

(10) Patent No.: US 8,059,190 B2
(45) Date of Patent: Nov. 15, 2011

(54) PORTABLE ELECTRONIC APPARATUS AND SUPPLEMENTARY LIGHT DEVICE

(75) Inventors: Jen-Tsorng Chang, Taipei Hsien (TW); Chau-Yuan Ke, Taipei Hsien (TW); Yi-Mou Huang, Taipei Hsien (TW); Yu-Chien Huang, Taipei Hsien (TW); Hsiang-Chieh Yu, Taipei Hsien (TW); Hsin-Hung Chuang, Taipei Hsien (TW); Han-Bang Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/468,849

(22) Filed: May 19, 2009

(65) Prior Publication Data

US 2009/0322930 A1    Dec. 31, 2009

(30) Foreign Application Priority Data

Jun. 30, 2008   (CN) .......................... 2008 10 302490

(51) Int. Cl.
*H04N 5/225* (2006.01)
(52) U.S. Cl. ....................................................... 348/371
(58) Field of Classification Search .................. 348/370, 348/371; 396/155, 176
See application file for complete search history.

(56) References Cited

U.S. PATENT DOCUMENTS

| 6,414,931 | B1  |   | 7/2002  | Maeda et al. |         |
|-----------|-----|---|---------|--------------|---------|
| 2007/0086085 | A1 | * | 4/2007  | Kitaoka et al. | 359/362 |
| 2009/0237819 | A1 | * | 9/2009  | Ke | 359/827 |
| 2009/0268311 | A1 | * | 10/2009 | Ke | 359/704 |
| 2009/0304989 | A1 | * | 12/2009 | Ke | 428/131 |
| 2010/0033852 | A1 | * | 2/2010  | Ke | 359/824 |

FOREIGN PATENT DOCUMENTS

| CN | 1184624 C | 7/1999 |
| WO | 2008/032952 A | 3/2008 |

* cited by examiner

*Primary Examiner* — Jason Whipkey
(74) *Attorney, Agent, or Firm* — Altis Law Group, Inc.

(57) ABSTRACT

A portable electronic apparatus includes a main body, a camera device, and a supplementary light device. The camera device and the supplementary light device are fixed on the main body. The supplementary light device includes a light module, a lens module, and a motor. The light module includes a circuit board, a light source, and a heat sink opposite to the light source. The lens module includes a lens barrel and a plurality of lenses received in the lens module. The motor drives the lens module to change the intensity distribution of the light from the light module.

20 Claims, 3 Drawing Sheets

PORTABLE ELECTRONIC APPARATUS AND SUPPLEMENTARY LIGHT DEVICE

BACKGROUND

1. Technical Field

The present disclosure relates to portable electronic apparatuses, and particularly, to a portable electronic apparatus with a supplementary light.

2. Description of Related Art

Lenses are widely used for image capture in portable electronic apparatuses, such as personal digital assistants (PDA). Many portable electronic apparatuses, however, cannot capture images in low ambient light. Accordingly, a flash or other supplementary illumination may be provided. However, the intensity distribution of the supplementary light is set, and image capture with the portable electronic apparatus remains limited under different ambient light levels.

Therefore, what is needed is a portable electronic apparatus that can address the limitations described.

BRIEF DESCRIPTION OF THE DRAWINGS

Many aspects of a disclosed portable electronic apparatus can be better understood with reference to the following drawings. The components in the drawings are not necessarily drawn to scale, the emphasis instead being placed upon clearly illustrating the principles of the present voice coil motor actuator. Moreover, in the drawings, like reference numerals designate corresponding parts throughout the several views.

DETAILED DESCRIPTION

Figure 1:
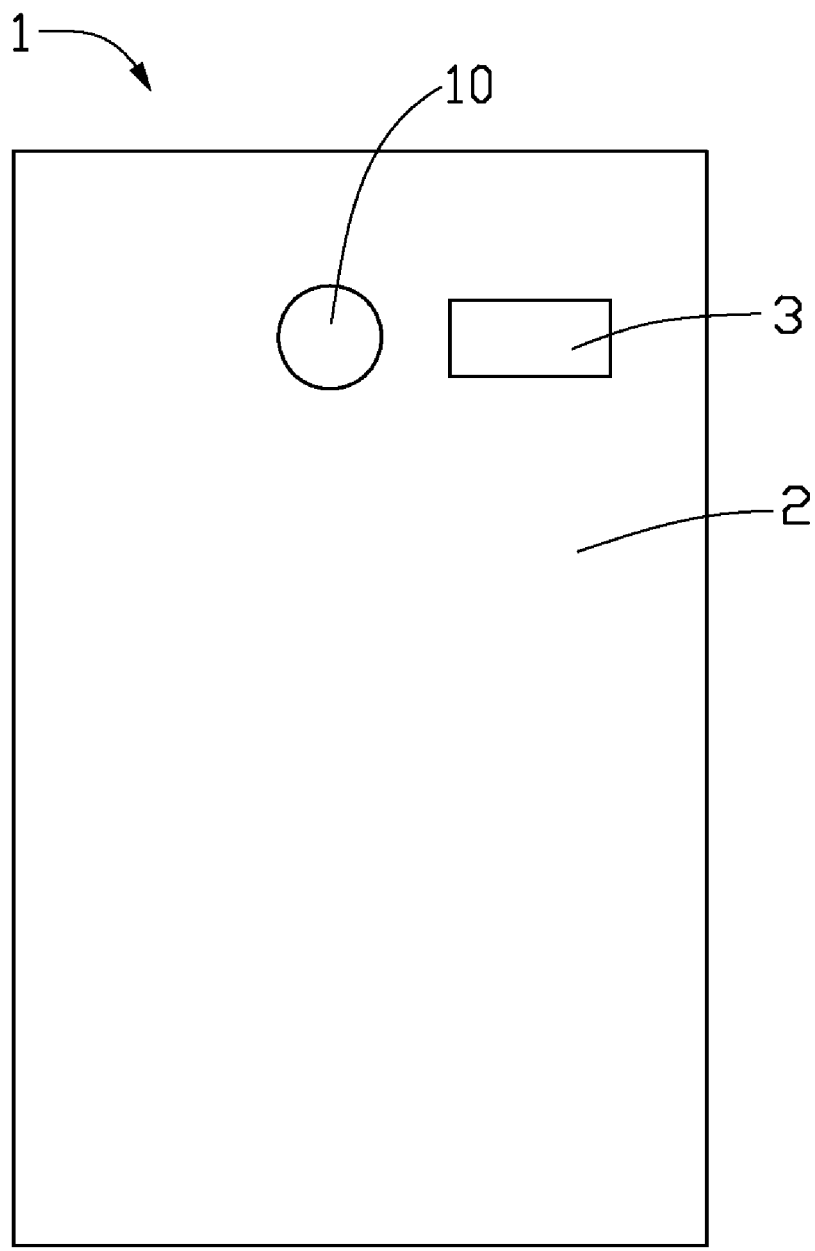
FIG. 1 is a schematic view of a portable electronic apparatus with a supplementary light device.

Referring to FIG. 1, a portable electronic apparatus 1 includes a main body 2, a camera device 3, and a supplementary light device 10. The camera device 3 and supplementary light device 10 are fixed on the main body 2. The supplementary light device 10 supplies light when the camera device 3 is working.

Figure 2:
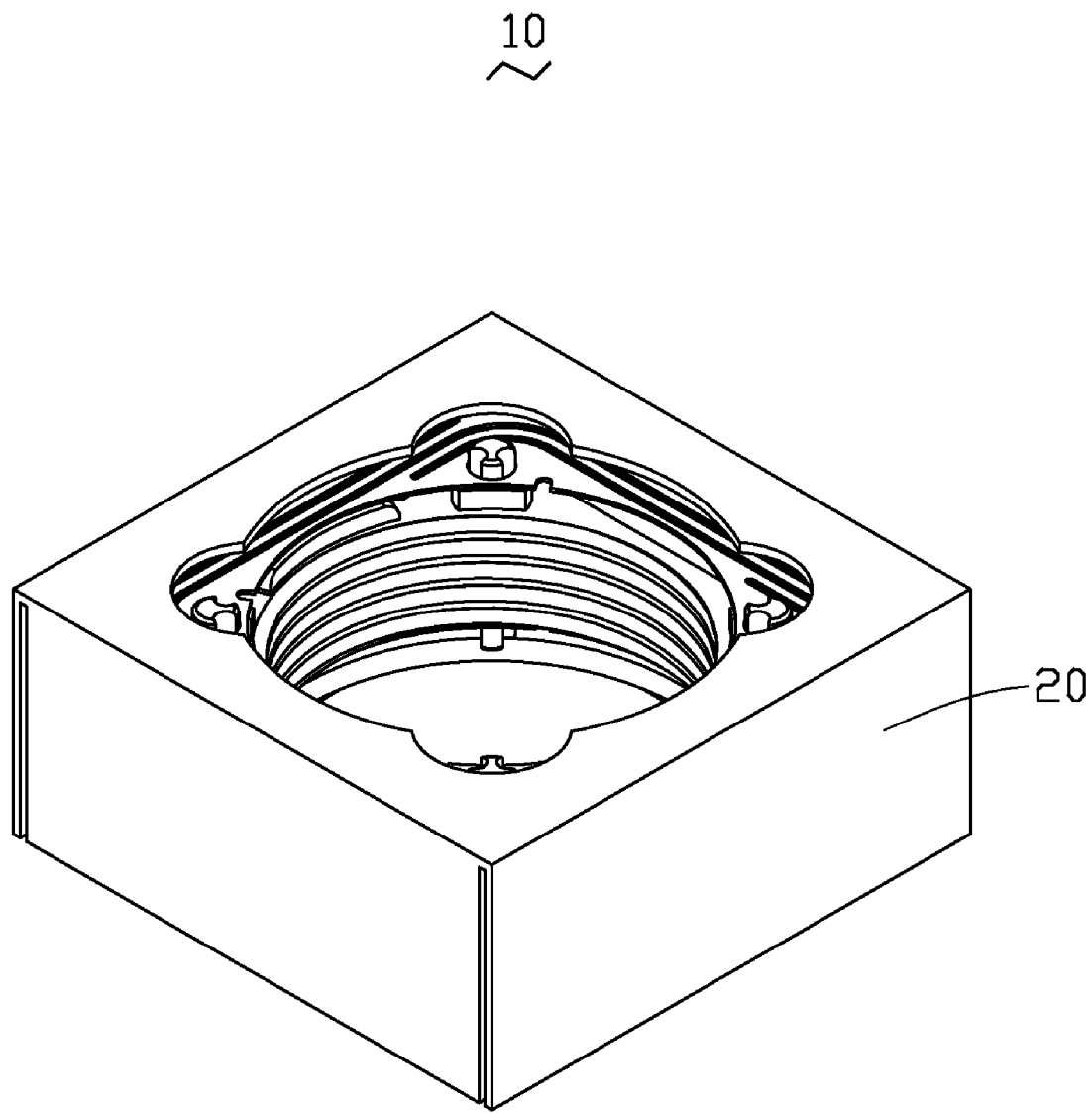
FIG. 2 is a schematic view of the supplementary light device.
Figure 3:
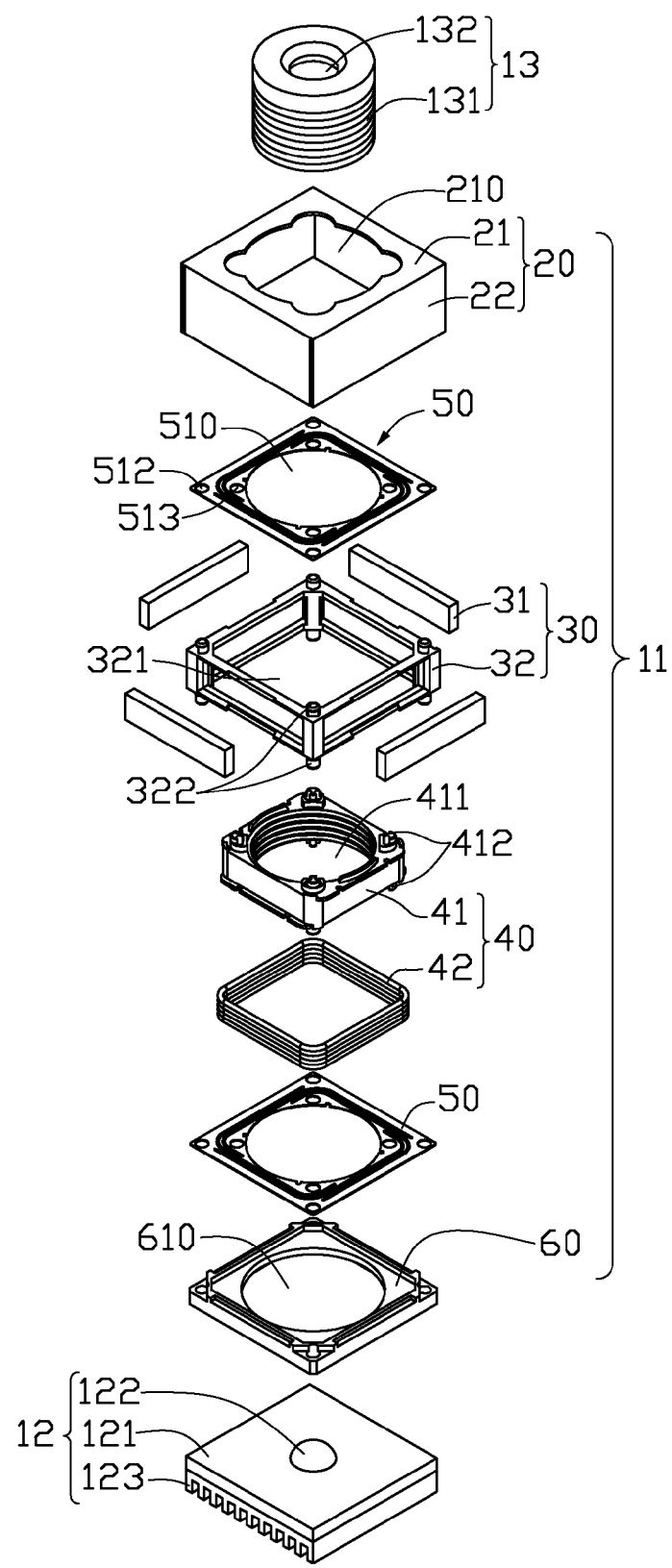
FIG. 3 is an exploded view of the supplementary light device.

Referring to FIGS. 2 and 3, the supplementary light device 10 includes a motor 11, a light module 12, and a lens module 13. Light emitted from the light module 12 passes through the lens module 13. The motor 11 drives the lens module 13 to change the intensity distribution of the light from the light module 12.

The light module 12 includes a circuit board 121, a light source 122, and a heat sink 123 opposite to the light source 122. The light source 122 may be a light emitting diode (LED) or organic light emitting diode (OLED). The heat sink 123 dissipates heat from the circuit board 121 and light source 122.

The lens module 13 includes a lens barrel 131 and a plurality of lenses 132 received in the lens module 13.

The motor 11 may be a voice coil motor, in one example, including a shell 20, a fixed unit 30, a movable unit 40, two spring plates 50 and a holder 60.

The shell 20 reduces electromagnetic interference (EMI). The shell 20 includes a top plate 21, and four side plates 22 extending downward from four edges of the top plate 21, cooperatively defining a receiving space therebetween. A first through hole 210 passing light is defined in the center of the top plate 21. The shell 20 engages the holder 60 to receive the fixed unit 30, the movable unit 40, and the two spring plates 50 in the receiving space. A second through hole 610 passing light is defined in the center of the holder 60.

The fixed unit 30 includes a frame body 32 and four magnets 31 coupled to the frame body 32. A first chamber 321 is defined in the frame body 32 and receives the movable unit 40. A number of first locating pins 322 respectively protrude vertically from the top and bottom sides of the frame body 32 at each corner thereof. The frame body 32 may be substantially square shaped, in one example.

The movable unit 40 includes a barrel 41 and coils 42. The coils 42 wrap around the outer wall of the barrel 41. The movable unit 40 is positioned in the first chamber 321 and may be movable relative to the fixed unit 30. A second chamber 411 is defined in the barrel 41. The second chamber 411 positions the lens module 13. A number of second locating pins 412 respectively protrude vertically from top and bottom sides of the barrel 41 at each corner thereof. The barrel 41 may be substantially square shaped, in one example.

A third through hole 510 passing light is defined in the center of each of the two spring plates 50. A number of first locating holes 512 corresponding to the respective first locating pins 322 are defined in the outer corner of spring plates 50. The first locating holes 512 cooperate with the first locating pins 322 to locate and fix the flat spring plate 50 to the frame body 32. A number of second locating holes 513 corresponding to the respective second locating pins 412 are defined in the inner corner of spring plates 50. The second locating holes 513 cooperate with the second locating pins 412 to locate and fix the flat spring plate 50 to the barrel 41. Two spring plates 50 may be substantially square shaped, in one example.

When receiving electric current applied thereto, the coils 42 are excited and act upon the magnets 31, generating a magnetic force to linearly drive the lens module 13 received in the barrel 41 away from the light module 12. Motion of the barrel 41 drives the lens module 13 to change the distance between the light module 12 and the lens module 13, changing the intensity distribution of the light from the light module 12.

When electric current is cut off, the two spring plates 50 impart a restoring force to the barrel 41, thereby returning the barrel 41 to its former position.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A supplementary light device for a portable electronic apparatus, comprising:
    a light module comprising a circuit board, a light source, and a heat sink opposite to the light source;
    a lens module comprising a lens barrel and a plurality of lenses received in the lens module;
    a motor comprising:
        a fixed unit comprising a substantially square-shaped frame body and a plurality of magnets, wherein the frame body comprises a first chamber defined in the frame body;
        a movable unit positioned in the first chamber, comprising a substantially square-shaped barrel and a plurality of coils, wherein the barrel comprises a second chamber defined in the frame body;

two substantially square-shaped spring plates, each of the two spring plates comprising a plurality of first locating holes and second locating holes;

a plurality of first locating pins, each of the first locating pins interconnected between respective first locating holes of the two spring plates;

a plurality of second locating pins, each of the second locating pins interconnected between respective second locating holes of the two spring plates; and a shell coupled to a holder, accommodating the fixed unit, the movable unit, and the two spring plates therein.

2. The supplementary light device for a portable electronic apparatus as claimed in claim 1, wherein the light source is a light emitting diode (LED) or an organic light emitting diode (OLED).

3. The supplementary light device for a portable electronic apparatus as claimed in claim 1, wherein the shell comprises a top plate, and four side plates, wherein the top plate comprises a first through hole defined in the top plate so as to pass light through the first through hole.

4. The supplementary light device for a portable electronic apparatus as claimed in claim 3, wherein the holder comprises a second through hole defined in the center thereof so as to pass light through the second through hole.

5. The supplementary light device for a portable electronic apparatus as claimed in claim 4, wherein each of the two spring plates comprises a third through hole defined in the center thereof so as to pass light through the third through hole.

6. The supplementary light device for a portable electronic apparatus as claimed in claim 1, wherein the plurality of first locating pins protrude from top and bottom sides of the frame body at each corner thereof.

7. The supplementary light device for a portable electronic apparatus as claimed in claim 1, wherein the plurality of second locating pins protrude from top and bottom sides of the barrel at each corner thereof.

8. The supplementary light device for a portable electronic apparatus as claimed in claim 1, wherein the plurality of first locating holes of each of the two spring plates are defined in each outer corner of each of the two spring plates.

9. The supplementary light device for a portable electronic apparatus as claimed in claim 1, wherein the plurality of second locating holes of each of the two spring plates are defined in each inner corner of each of the two spring plates.

10. The supplementary light device for a portable electronic apparatus as claimed in claim 1, wherein the lens module is positioned in the second chamber.

11. A portable electronic apparatus, comprising:
a main body;
a camera device fixed on the main body;
a supplementary light device fixed on the main body for supplying light when the camera device is working, wherein the supplementary light device comprises:
a light module comprising a circuit board, a light source, and a heat sink opposite to the light source;
a lens module comprising a lens barrel and a plurality of lenses received in the lens module;
a motor comprising:
a fixed unit comprising a substantially square-shaped frame body and a plurality of magnets, wherein the frame body comprises a first chamber defined in the frame body;
a movable unit positioned in the first chamber, comprising a substantially square-shaped barrel and a plurality of coils, wherein the barrel comprises a second chamber defined in the frame body;
two substantially square-shaped spring plates, each of the two spring plates comprising a plurality of first locating holes and second locating holes;
a plurality of first locating pins, each of the first locating pins interconnected between respective first locating holes of the two spring plates;
a plurality of second locating pins, each of the second locating pins interconnected between respective second locating holes of the two spring plates; and
a shell coupled to a holder, accommodating the fixed unit, the movable unit, and the two spring plates therein.

12. The portable electronic apparatus as claimed in claim 11, wherein the light source is a light emitting diode (LED) or an organic light emitting diode (OLED).

13. The portable electronic apparatus as claimed in claim 11, wherein the shell comprises a top plate, and four side plates, wherein the top plate comprises a first through hole defined in the top plate so as to pass light through the first through hole.

14. The portable electronic apparatus as claimed in claim 13, wherein the holder comprises a second through hole defined in the center thereof so as to pass light through the second through hole.

15. The portable electronic apparatus as claimed in claim 14, wherein each of the two spring plates comprises a third through hole defined in the center thereof so as to pass light through the third through hole.

16. The portable electronic apparatus as claimed in claim 11, wherein the plurality of first locating pins protrude from top and bottom sides of the frame body at each corner thereof.

17. The portable electronic apparatus as claimed in claim 11, wherein the plurality of second locating pins protrude from top and bottom sides of the barrel at each corner thereof.

18. The portable electronic apparatus as claimed in claim 11, wherein the plurality of first locating holes of each of the two spring plates are defined in each outer corner of each of the two spring plates.

19. The portable electronic apparatus as claimed in claim 11, wherein the plurality of second locating holes of each of the two spring plates are defined in each inner corner of each of the two spring plates.

20. The portable electronic apparatus as claimed in claim 11, wherein the lens module is positioned in the second chamber.

* * * * *